United States Patent Office 3,780,030
Patented Dec. 18, 1973

3,780,030
1,2,3-BENZOXATHIAZIN-4(3H)-ONE 2-OXIDES AND THEIR PREPARATION
Leo R. Morris, Midland, Mich., assignor to The Dow Chemical Company, Midland, Mich.
No Drawing. Filed Oct. 29, 1971, Ser. No. 194,053
Int. Cl. C07d 95/00
U.S. Cl. 260—243 R    7 Claims

ABSTRACT OF THE DISCLOSURE 1,2,3-benzoxathiazin-4(3H)-one 2-oxides corresponding to the formula

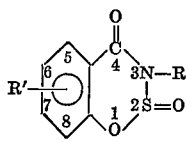

wherein R represents H, phenyl, halophenyl, nitrophenyl, or halonitrophenyl and R' represents H, halo, dihalo, or phenyl. The compounds are prepared by reacting a corresponding salicylamide or salicylanilide with thionyl chloride, advantageously in the presence of a solvent such as benzene or methylene chloride and, if desired, in the presence of an acid acceptor such as pyridine or a lower trialkylamine. The compounds are useful as pesticides.

SUMMARY OF THE INVENTION

This invention concerns 1-,2,3-benzoxathiazin-4-(3H)-one 2-oxides represented by the formula

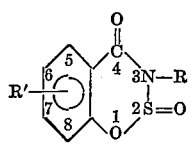

wherein R represents H, loweralkyl, phenyl, or substituted phenyl wherein the substituents are halo (chloro, bromo or iodo) and/or nitro; and R' represents H (i.e., no substitution on the benzenoid moiety), monohalo or dihalo (chloro, bromo or iodo) or phenyl, and wherein the substituents on the benzenoid moiety may be in the 6- and/or 8-position. The term "loweralkyl" as employed herein and in the claims includes 1 to 4 carbon alkyl groups such as, for example, methyl, ethyl, propyl or butyl.

In general, the compounds of this invention are solids having limited water-solubility, are colorless or pale yellow in appearance and have discrete melting points.

The compounds are prepared by reacting a corresponding salicylamide or a corresponding salicylanilide with thionyl chloride according to the following respective equations:

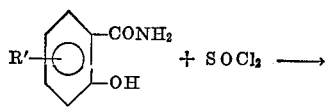

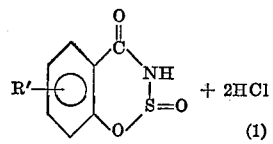

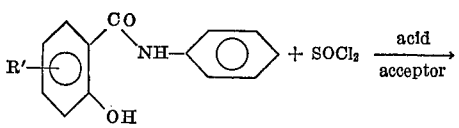

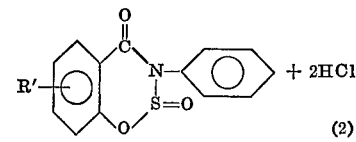

The reaction is advantageously carried out in the presence of a suitable solvent such as, for example, methylene chloride, chloroform, benzene or toluene or mixtures of such solvents. The amounts of the reactants to be employed are not critical, some of the product being formed when employing any proportions of the reactants. The reaction consumes the reactants in the ratio of one mole of the salicylamide or salicylanilide to one mole of thionyl chloride, and the employment of such proportions or a small excess of thionyl chloride is advantageous. The reaction in each case proceeds at a temperature at which hydrogen chloride of reaction is removed, suitably at reflux temperature, until the reaction is substantially complete, as determined by hydrogen chloride evolution or chloride formation. Advantageously, the reaction may be carried out in the presence of an acid acceptor such as, for example, a lower trialkylamine, e.g., triethylamine, or pyridine. The acid acceptor is not necessary when a salicylamide unsubstituted on the nitrogen, i.e., containing a primary amido group, is the co-reactant.

In carrying out the reaction, the salicylanilide or salicylamide is contacted gradually with the thionyl chloride and the reaction mixture is maintained for a predetermined period of time in the reaction temperature range to complete the reaction. In a representative procedure, thionyl chloride and triethylamine are each added gradually to a stirred mixture of salicylanilide and methylene chloride. The reaction mixture is maintained at reflux temperature until completion of the reaction, generally from about 1 to about 2 hours.

Upon completion of the reaction, the desired product is recovered by conventional procedures. For example, the salicylanilide reaction mixture is cooled to room temperature, washed with water until free of chloride, and the solid product is recovered by filtration and crystallized from isopropyl alcohol or aqueous 80% dioxane, while the salicylamide reaction mixture is filtered, washed with benzene and vacuum dried to give purified product.

DETAILED DESCRIPTION OF THE INVENTION

The following examples further describe the invention and the manner and process of making and using it to enable art skilled persons to make and use the same, and set forth the best mode contemplated by the inventor of carrying out the invention.

EXAMPLE 1

6,8-dibromo-3-(p-bromophenyl)-1,2,3-benzoxathiazin-4(3H)-one 2-oxide

A mixture of 45 g. (0.1 mole) of 3,4,5-tribromosalicylanilide and 100 ml. of methylene chloride is stirred while 20.8 g. (0.206 mole) of triethylamine and 12.5 g. (0.105 mole) of thionyl chloride are each added dropwise over a period of 2 minutes and 6 minutes, respectively. After heating to reflux for 1 hour, the reaction mixture is cooled to 25° C. and washed successively with 100 ml. and 150 ml. portions of water. The organic phase is filtered to remove 10 g. of crude crystalline solid product, melting at 189°–190° C. A recrystallization from 100 ml.

of aqueous 80% dioxane gives, after vacuum drying, 5.7 g. of product, melting at 191.5°–192.5° C.

Anal., percent: Calcd. for $C_{13}H_6Br_3NO_3S$: C, 31.5; H, 1.2; Br, 48.3; N, 2.8; S, 6.5. Found: C, 31.4; H, 1.2; Br, 48:5; N, 2.7; S, 6.6.

Infrared analysis of the product shows a spectrum consistent with the titular structure.

EXAMPLE 2

3-phenyl-1,2,3-benzoxathiazin-4(3H)-one 2-oxide

A mixture of 21.3 g. (0.1 mole) of salicylanilide and 100 ml. of methylene chloride is stirred while 20.8 g. (0.206 mole) of triethylamine and 12.5 g. (0.105 mole) of thionyl chloride are each added dropwise over 5 minute periods. After heating the system to reflux for 1 hour and then cooling to 25° C., the mixture is washed twice with 150 ml. portions of aqueous 5% hydrochloric acid and once with water. Concentration of the organic phase by heating to 55°/15 mm. Hg gives 23.5 g. of crude crystalline product. Recrystallization from 100 ml. isopropyl alcohol gives, after vacuum drying, 5.7 g. of product melting at 114°–115.5° C.

Anal., percent: Calcd. for $C_{13}H_9NO_3S$: C, 60.2; H, 3.5; N, 5.4; S, 12.4. Found: C, 60.5; H, 3.5; N, 5.3; S, 12.0.

Infrared analysis of the product shows a spectrum consistent with the titular structure. NMR analysis confirms the titular structure.

EXAMPLE 3

1,2,3-benzoxathiazin-4(3H)-one 2-oxide

A slurry of 13.7 g. (0.1 mole) of salicylamide, 13.1 g. (0.11 mole) of thionyl chloride and 200 ml. of benzene is stirred and refluxed for 2 hours. After cooling to 25° C., the reaction mixture is filtered, the cake washed with 100 ml. of benzene and vacuum dried to give 13.1 g. of product, melting at 183°–185° C., as a light yellow solid.

Anal., percent: Calcd. for $C_7H_5NO_3S$: C, 45.9; H, 2.8; N, 7.6; S, 17.5. Found: C, 46.2; H, 2.9; N, 7.7; S, 16.8.

Infrared analysis of the product gives a spectrum consistent with the titular structure.

EXAMPLE 4

The following compounds are prepared using procedures as described above:

(A) 8-phenyl-3-(n-butyl)-1,2,3-benzoxathiazin-4(3H)-one 2-oxide, melting at 88°–118° C., by reacting 3-phenyl-N-(n-butyl)salicylamide with thionyl chloride.

(B) 6-chloro-3-(2'-chloro-5'-nitrophenyl)-1,2,3-benzoxathiazin-4(3H)-one 2-oxide, melting at 209.5°–211° C., by reacting 5-dichloro-5'-nitrosalicylanilide with thionyl chloride.

(C) 6-chloro-3-(2'-chloro-4'-nitrophenyl)-1,2,3-benzoxathiazin-4(3H)-one 2-oxide, melting at 140.5°–145.5° C., by reacting 2,6-dichloro-4'-nitrosalicylanilide with thionyl chloride.

The compounds of this invention when used at a dosage level of about 1 to about 1000 parts per million (p.p.m.) have antimicrobial activity against one or more of the organisms Staphylcoccus aureus, Escherichia coli, Trichopyton mentagrophytes, Bacillus subtilis, Aspergillus terreus, Pullularia pullulans, Salmonella typhosa, Mycobacterium phlei, Rhizopus nigricans, Ceratocystis ips, Cephaloascus fragans, Bremia lactucae, Piricularia oryzae, and Trichoderm sp. Madison P–42.

The following table illustrates the antimicrobial activity at the given concentrations in standard culture media of representative compounds herein disclosed.

TABLE

| Organism | Compound of example | Cidal conc., p.p.m. |
|---|---|---|
| S. aureus | 1 | 1. |
|  | 2 | 500. |
|  | 4B | 1. |
|  | 4C | 1. |
| E. coli | 1 | 100. |
|  | 2 | 500 (50% kill). |
|  | 4C | 100. |
| T. mentagrophytes | 1 | 10. |
|  | 2 | 500. |
|  | 3 | 500 (50% kill). |
|  | 4B | 100 (50% kill). |
|  | 4C | 10. |
| B. subtilis | 1 | 1. |
|  | 2 | 500. |
|  | 4B | 100. |
|  | 4C | 1. |
| A. terreus | 1 | 100. |
|  | 2 | 500. |
|  | 4C | 100. |
| P. pullulans | 1 | 10. |
|  | 2 | 500. |
|  | 4C | 10. |
| S. typhosa | 1 | 100. |
|  | 2 | 500 (50% kill). |
|  | 4C | 100. |
| M. Phlei | 1 | 1. |
|  | 2 | 500. |
|  | 3 | 500 (50% kill). |
|  | 4A | 400 (50% kill). |
|  | 4B | 1. |
|  | 4C | 1. |
| R. nigricans | 1 | 100. |
|  | 2 | 500 (50% kill). |
|  | 4C | 100. |
| Trichoderm sp. Madison P–42 | 1 | 500. |
|  | 2 | 100. |
|  | 3 | 500. |
|  | 4A | 400 (50% kill). |
| Bremia lactucae | 4B | 400 (75% kill). |
|  | 4C | 400 (67% kill). |
| Piricularia oryzae | 4B | 400 (90% kill). |

What is claimed is:

1. A compound represented by the formula

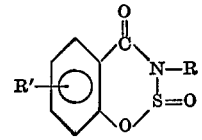

wherein R represents H, loweralkyl, phenyl or substituted phenyl wherein the substituents are selected from at least one of halo and nitro; and wherein R' represents H, monohalo, dihalo or phenyl, which R' substituents are in either or both of the 6 and 8-positions.

2. The compound of claim 1 which is 6,8-dibromo - 3 - (p-bromophenyl)-1,2,3-benzoxathiazine-4(3H)-one 2-oxide.

3. The compound of claim 1 which is 3-phenyl-1,2,3-benzoxathiazin-4(3H)-one 2-oxide.

4. The compound of claim 1 which is 6-chloro-3-(2'-chloro-4'-nitrophenyl)-1,2,3-benzoxathiazin-4(3H) - one 2-oxide.

5. The compound of claim 1 which is 1,2,3-benzoxathiazin-4(3H)-one 2-oxide.

6. The compound of claim 1 which is 8-phenyl-3-(n-butyl)-1,2,3-benzoxathiazin-4(3H)-one 2-oxide.

7. The compound of claim 1 which is 6-chloro-3-(2'-chloro-5'-nitrophenyl)-1,2,3-benzoxathiazin-4(3H) - one 2-oxide.

References Cited

Katz et al., J. Org. Chem., vol. 19, p. 110 (1954).

JOHN M. FORD, Primary Examiner

U.S. Cl. X.R.

424—246